US012745219B2

(12) United States Patent
Kalbasi

(10) Patent No.: US 12,745,219 B2
(45) Date of Patent: Sep. 22, 2026

(54) APPARATUS AND METHODS FOR IMPROVING MULTI-SIM DEVICES PERFORMANCE AND OPERATION

(71) Applicant: Toyota Jidosha Kabushiki Kaisha, Toyota (JP)

(72) Inventor: Reza Kalbasi, San Diego, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 318 days.

(21) Appl. No.: 18/557,013

(22) PCT Filed: Apr. 26, 2022

(86) PCT No.: PCT/US2022/026273
§ 371 (c)(1),
(2) Date: Oct. 24, 2023

(87) PCT Pub. No.: WO2022/232092
PCT Pub. Date: Nov. 3, 2022

(65) Prior Publication Data

US 2024/0205881 A1 Jun. 20, 2024

Related U.S. Application Data

(60) Provisional application No. 63/181,303, filed on Apr. 29, 2021.

(51) Int. Cl.
*H04W 68/02* (2009.01)
*H04W 88/06* (2009.01)

(52) U.S. Cl.
CPC ........... *H04W 68/02* (2013.01); *H04W 88/06* (2013.01)

(58) Field of Classification Search
None
See application file for complete search history.

(56) References Cited

U.S. PATENT DOCUMENTS

2017/0093977 A1* 3/2017 Amemiya ............. H04L 67/568
2020/0396591 A1 12/2020 Ou et al.
(Continued)

FOREIGN PATENT DOCUMENTS

CN 111294789 A 6/2020
WO WO 2020/247043 A1 12/2020
WO WO 2021/152405 A1 8/2021

OTHER PUBLICATIONS

Notice of Allowance issued in U.S. Appl. No. 19/090,189, dated May 16, 2025.
(Continued)

*Primary Examiner* — Frantz Bataille
(74) *Attorney, Agent, or Firm* — Finnegan, Henderson, Farabow, Garrett and Dunner, LLP

(57) ABSTRACT

A method for managing message services on a multiple universal subscriber identification module (MUSIM) user equipment (UE) having at least a first USIM and a second USIM includes calculating a first time occasion that message services related to the first USIM are used, and a second time occasion that the message services related to the second USIM are used: determining a first paging pattern based on the first time occasion and a second paging pattern based on the second time occasion: transmitting, to a network access node, the first paging pattern and the second paging pattern; and receiving, from the network access node, a message indicating acceptance or rejection of the first paging pattern, and acceptance or rejection of the second paging pattern.

11 Claims, 17 Drawing Sheets

(56) References Cited

U.S. PATENT DOCUMENTS

2023/0045763 A1 * 2/2023 Kim .................... H01M 8/0438
2023/0045765 A1 * 2/2023 Youn .................. H04W 60/005

OTHER PUBLICATIONS

Nokia, et al: "Analysis of solutions for paging collision", R2-2009264, 3GPP TSG-RAN WG2 Meeting #112e, 3rd Generation Partnership Project (3GPP), Elbonia, Nov. 2-Nov. 13, 2020, 3 pgs.

* cited by examiner

| Transport channel / Logical channel | BCH | PCH | DL-SCH |
|---|---|---|---|
| BCCH | X | | X |
| PCCH | | X | |
| CCCH | | | X |
| DCCH | | | X |
| DTCH | | | X |

FIG. 3A

| Transport channel / Logical channel | UL-SCH | RACH |
|---|---|---|
| CCCH | X | |
| DCCH | X | |
| DTCH | X | |

FIG. 3B

| Transport channel / Logical channel | SL-BCH | SL-SCH |
|---|---|---|
| SBCCH | X | |
| SCCH | | X |
| STCH | | X |

FIG. 3C

| Transport channel \ Physical channel | PDSCH | PDCCH | PBCH |
|---|---|---|---|
| BCH | | | X |
| PCH | X | | |
| DL-SCH | X | | |

| Transport channel \ Physical channel | PUSCH | PUCCH | PRACH |
|---|---|---|---|
| UL-SCH | X | | |
| RACH | | | X |

| Transport channel \ Physical channel | PSSCH | PSCCH | PSFCH | PSBCH |
|---|---|---|---|---|
| SL-BCH | | | | X |
| SL-SCH | X | | | |

SDAP
PDCP
RLC
MAC
PHY
SDAP
PDCP
RLC
MAC
PHY
UE 125A
UE 125B

RRC
PDCP
RLC
MAC
PHY
RRC
PDCP
RLC
MAC
PHY
UE 125A
UE 125B

PC5-S
PDCP
RLC
MAC
PHY
PC5-S
PDCP
RLC
MAC
PHY
UE 125A
UE 125B

RRC
RLC
MAC
PHY
RRC
RLC
MAC
PHY
UE 125A
UE 125B

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

APPARATUS AND METHODS FOR IMPROVING MULTI-SIM DEVICES PERFORMANCE AND OPERATION

CROSS-REFERENCE TO RELATED APPLICATIONS

This application is a § 371 national phase of PCT/US2022/026273, filed Apr. 26, 2022, which claims priority under 35 USC § 119(e) from U.S. Provisional Patent Application No. 63/181,303, filed on Apr. 29, 2021, each of which is incorporated herein by reference.

BACKGROUND OF THE INVENTION

The present invention is directed to 5G, which is the 5th generation mobile network. It is a new global wireless standard after 1G, 2G, 3G, and 4G networks. 5G enables networks designed to connect machines, objects and devices.

The invention is more specifically directed to managing message services on a multiple universal subscriber identification module (MUSIM) user equipment (UE) having at least a first USIM and a second USIM, the method includes calculating a first time occasion that message services related to the first USIM are used, and a second time occasion that the message services related to the second USIM are used; determining a first paging pattern based on the first time occasion and a second paging pattern based on the second time occasion; transmitting, to a network access node, the first paging pattern and the second paging pattern; and receiving, from the network access node, a message indicating acceptance or rejection of the first paging pattern, and acceptance or rejection of the second paging pattern.

SUMMARY OF THE INVENTION

In an embodiment, the invention provides a method of managing message services on a multiple universal subscriber identification module (MUSIM) user equipment (UE) having at least a first USIM and a second USIM. The method includes calculating a first time occasion that message services related to the first USIM are used, and a second time occasion that the message services related to the second USIM are used; determining a first paging pattern based on the first time occasion and a second paging pattern based on the second time occasion; transmitting, to a network access node, the first paging pattern and the second paging pattern; and receiving, from the network access node, a message indicating acceptance or rejection of the first paging pattern, and acceptance or rejection of the second paging pattern.

Determining the first paging pattern and the second paging patterns comprises: associating a priority-based ranking to the message services associated with each of the first universal subscriber identification module (USIM) and the second USIM; and determining the first paging pattern and the second paging pattern based on the priority-based rankings of the associated message services. Associating the priority-based ranking comprises: determining a criticality of a communication service related to the message services; and assigning a rank to each of the message services based on the criticality of the communication service of each of the message services. The priority-based ranking of the message services may be configured by a user, and alternatively, pre-configured by user equipment (UE) manufacturers.

The multiple universal subscriber identification module (MUSIM) user equipment (UE) also can have at least one of the first universal subscriber identification module (USIM) and the second USIM and the method further including: registering with a first network; registering with a second network via the first network; communicating multiple universal subscriber identification module (MUSIM) capability to the first network; and receiving, from the first network, a message indicating acceptance of the MUSIM communicated capability by the first network. Associating the priority-based ranking to the associated message services depends on time or geographical location or both. Preferably, the first paging pattern and the second paging pattern are based on a policy rule, and wherein the policy rule is provisioned by a policy control function (PCF) module of a first network. Also, the policy rule may be pre-configured, or configured by a user.

The network access node is an access and mobility management function (AMF) module of a first network.

In one form, the policy rule comprises a policy descriptor field, a rule precedence field, a traffic descriptor field, a route selection descriptor field, and a route selection validation field. For that matter, the method may include communicating to a network, by the multiple universal subscriber identification module (MUSIM) device, a message comprising a network assistance message, and alternatively, determining a third paging pattern if the first paging pattern is rejected by the network access node, or a fourth paging pattern if the second paging pattern is rejected by the network access node. The method may further include determining whether the first time occasion collides with the second time occasion.

In an embodiment, the invention provides a method of managing messages services, by a first wireless access node, in a wireless communication system. The method does so by receiving, from a multiple universal subscriber identification module (MUSIM) user equipment (UE) having at least a first USIM and a second USIM, a first message associated to a first network to the first USIM, and a second message associated to a second network to the second USIM based on the policy rule; establishing, with a second wireless access node, a paging policy for the UE, according to the first message and the second message; and transmitting, to the UE, an acknowledge message indicating acceptance or rejection of the first message and the second message. The first wireless access node is an access and mobility management (AMF) node, and the second wireless access node is a policy control function node. In the method, the first message includes a paging pattern preferred for the user equipment (UE) from the first network; and the second message includes a paging pattern preferred for the UE from the second network. The method may include transmitting, to the user equipment (UE), a message providing for network assistance message configuration.

In another embodiment, the invention provides a wireless communication device that includes a processor associated with a first universal subscriber identification module (USIM), and a second USIM, where the processor is configured to: calculate a first time occasion of message services related to the first USIM and a second time occasion of message services related to the second USIM and determine a first paging pattern based on the first time occasion and a second paging pattern based on the second time occasion; and a transceiver in communication with the processor, the transceiver configured to: transmit, to a network access node, the first and second paging patterns and receive, from the network access node, a message indicating acceptance or rejection of the first paging pattern, and acceptance or rejection of the second paging pattern.

BRIEF DESCRIPTION OF THE DRAWINGS

FIG. 3A, FIG. 3B and FIG. 3C show example mappings between logical channels and transport channels in downlink, uplink and sidelink, respectively, according to some aspects of some of various exemplary embodiments of the present disclosure.

FIG. 6 shows example physical signals in downlink, uplink and sidelink according to some aspects of some of various exemplary embodiments of the present disclosure.

DETAILED DESCRIPTION

Figure 1:
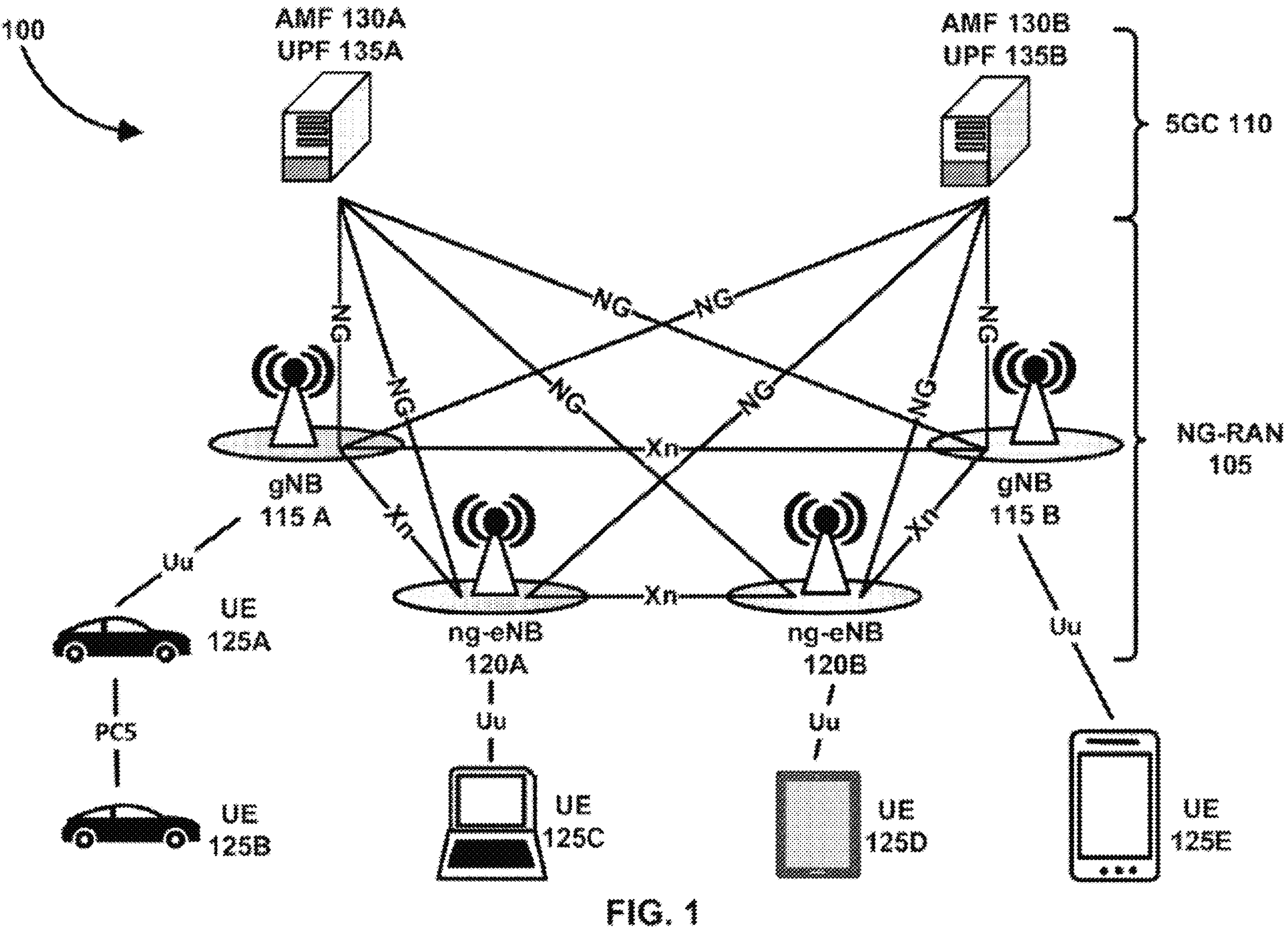
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (IOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception means for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for UEs such as a Mobile Station (MS), terminal equipment, terminal node, client device, mobile device, etc.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing & forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE 125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type.

During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that originates sidelink communication frames. The Destination Layer-2 ID may be a link-layer identity that identifies a device that are recipients of sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
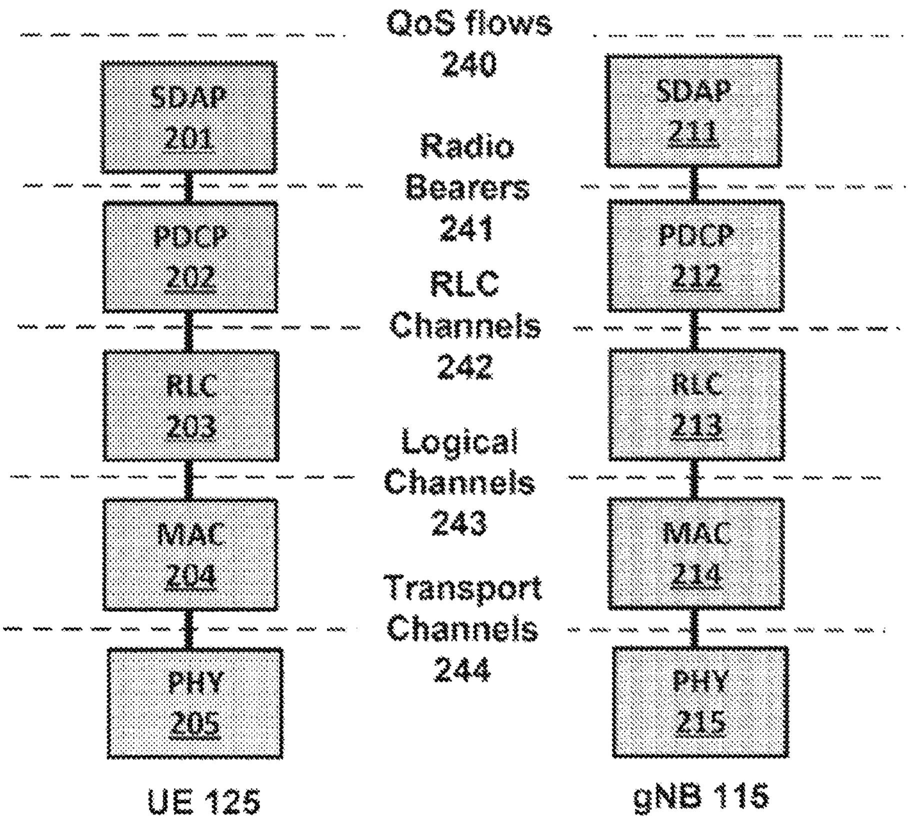
FIG. 2A and FIG. 2B show examples of radio protocol stacks for user plane and control plane, respectively, according to some aspects of some of various exemplary embodiments of the present disclosure.
Figure 2B:
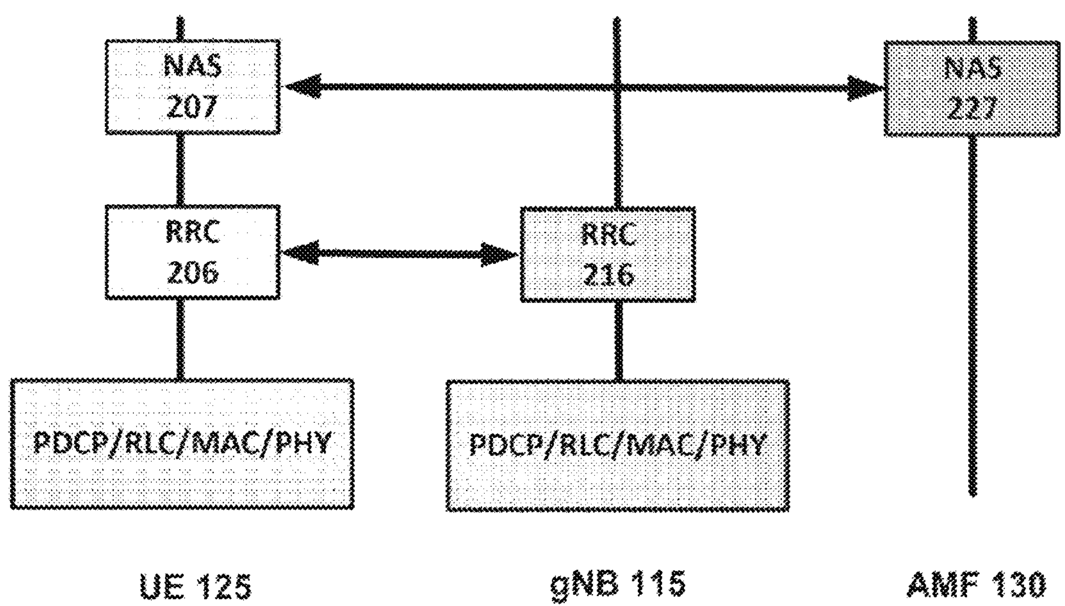

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or more different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology (ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern (s).

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by predefined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

Figures 4A, 4B, 4C:
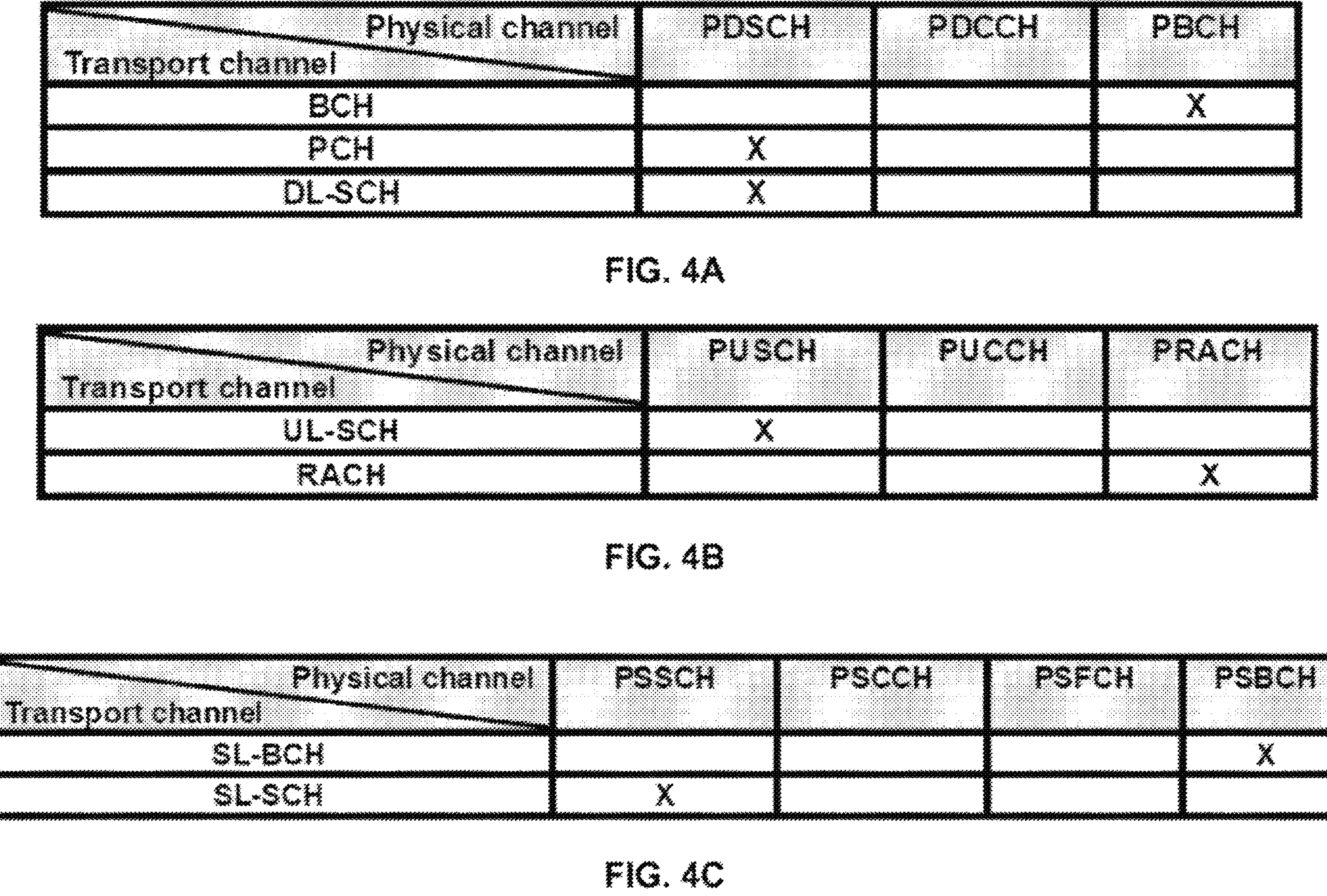
FIG. 4A, FIG. 4B and FIG. 4C show example mappings between transport channels and physical channels in downlink, uplink and sidelink, respectively, according to some aspects of some of various exemplary embodiments of the present disclosure.

FIG. 4A, FIG. 4B and FIG. 4C show example mappings between transport channels and physical channels in downlink, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may mapped to the PSCCH.

Figures 5A, 5B, 5C, 5D:
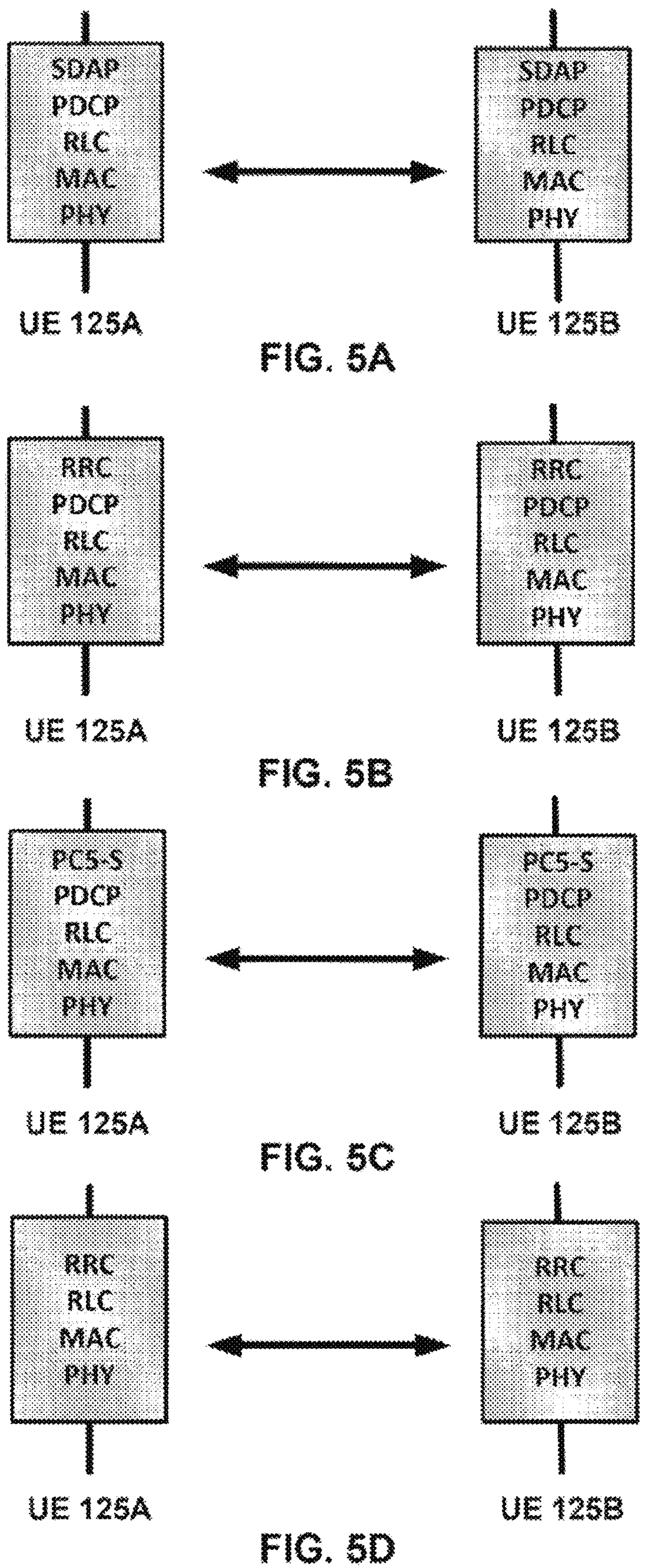
FIG. 5A, FIG. 5B, FIG. 5C and FIG. 5D show examples of radio protocol stacks for NR sidelink communication according to some aspects of some of various exemplary embodiments of the present disclosure.

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transmit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
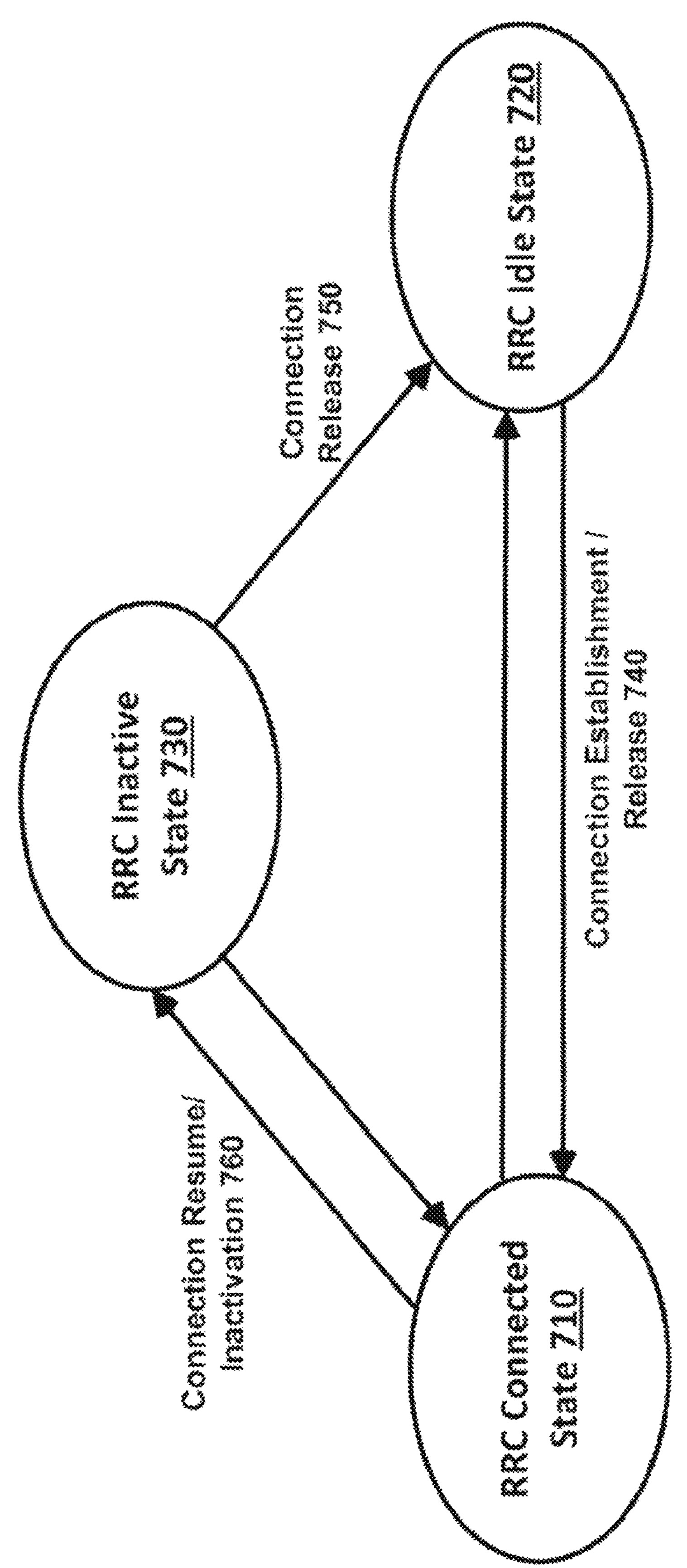
FIG. 7 shows examples of Radio Resource Control (RRC) states and transitioning between different RRC states according to some aspects of some of various exemplary embodiments of the present disclosure.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
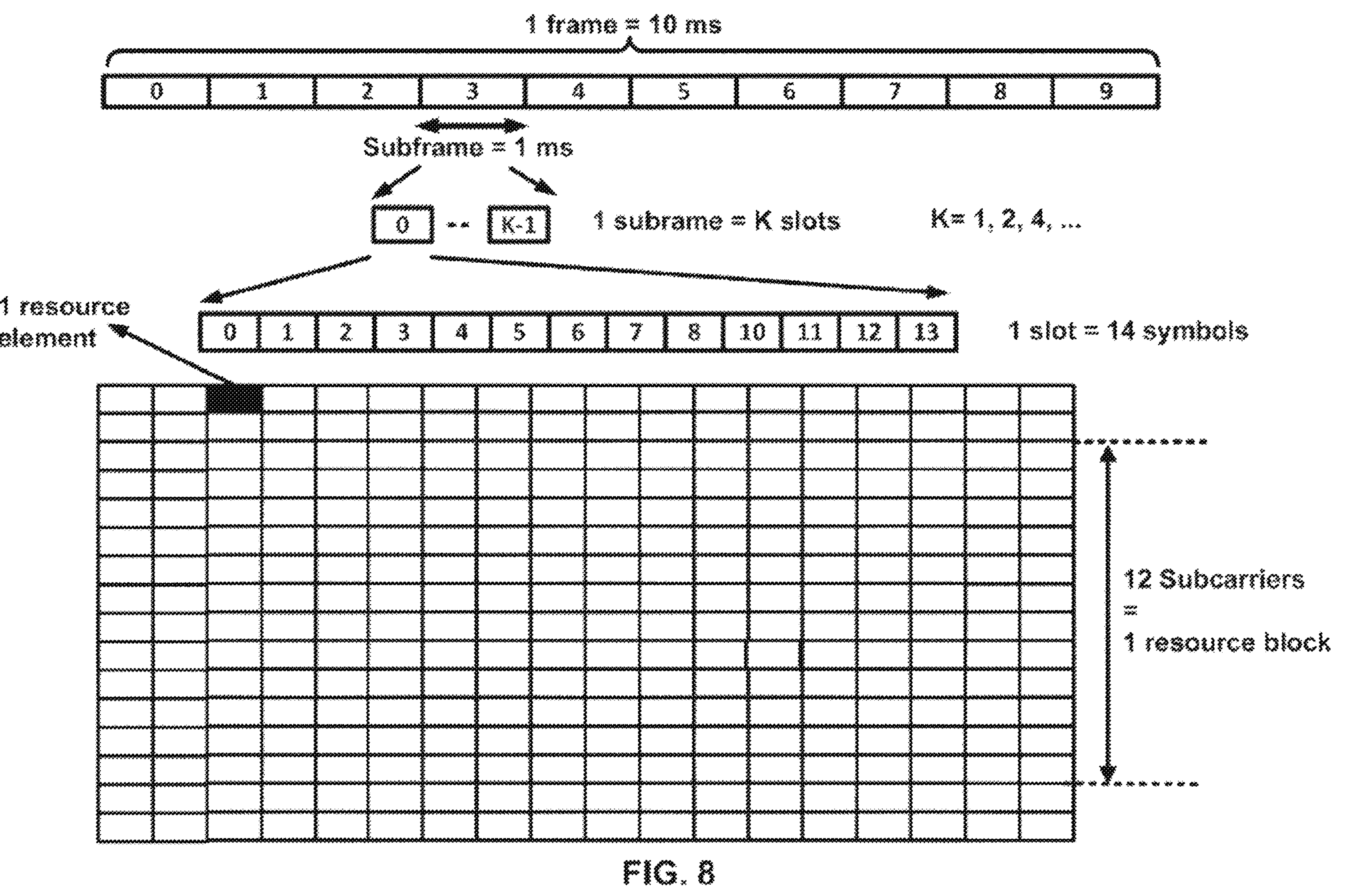
FIG. 8 shows example frame structure and physical resources according to some aspects of some of various exemplary embodiments of the present disclosure.

FIG. 8 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend of the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
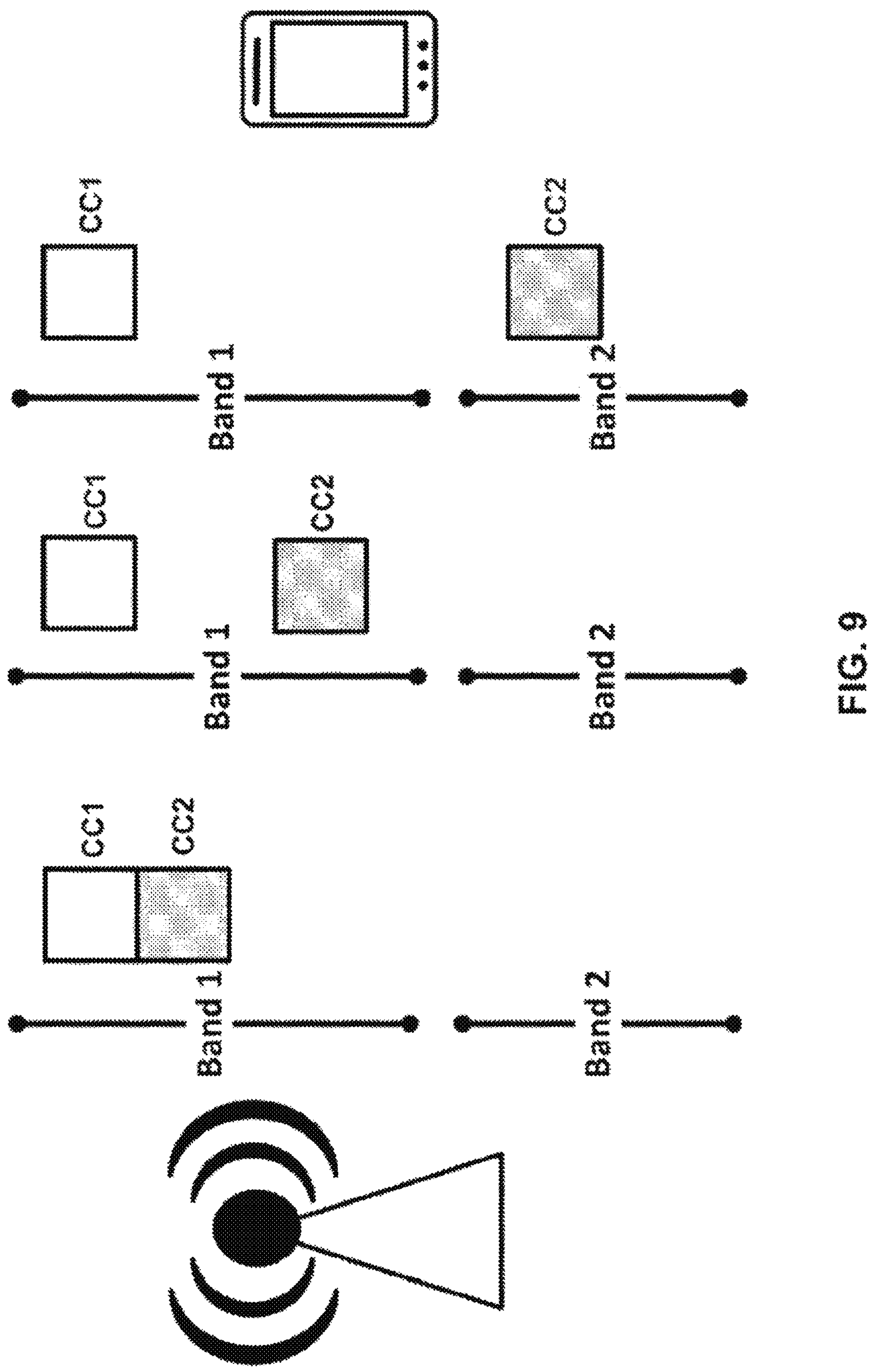
FIG. 9 shows example component carrier configurations in different carrier aggregation scenarios according to some aspects of some of various exemplary embodiments of the present disclosure.

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary Cell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity for the MCG for communications with the master base station and one MAC entity for the SCG for communications with the secondary base station.

Figure 10:
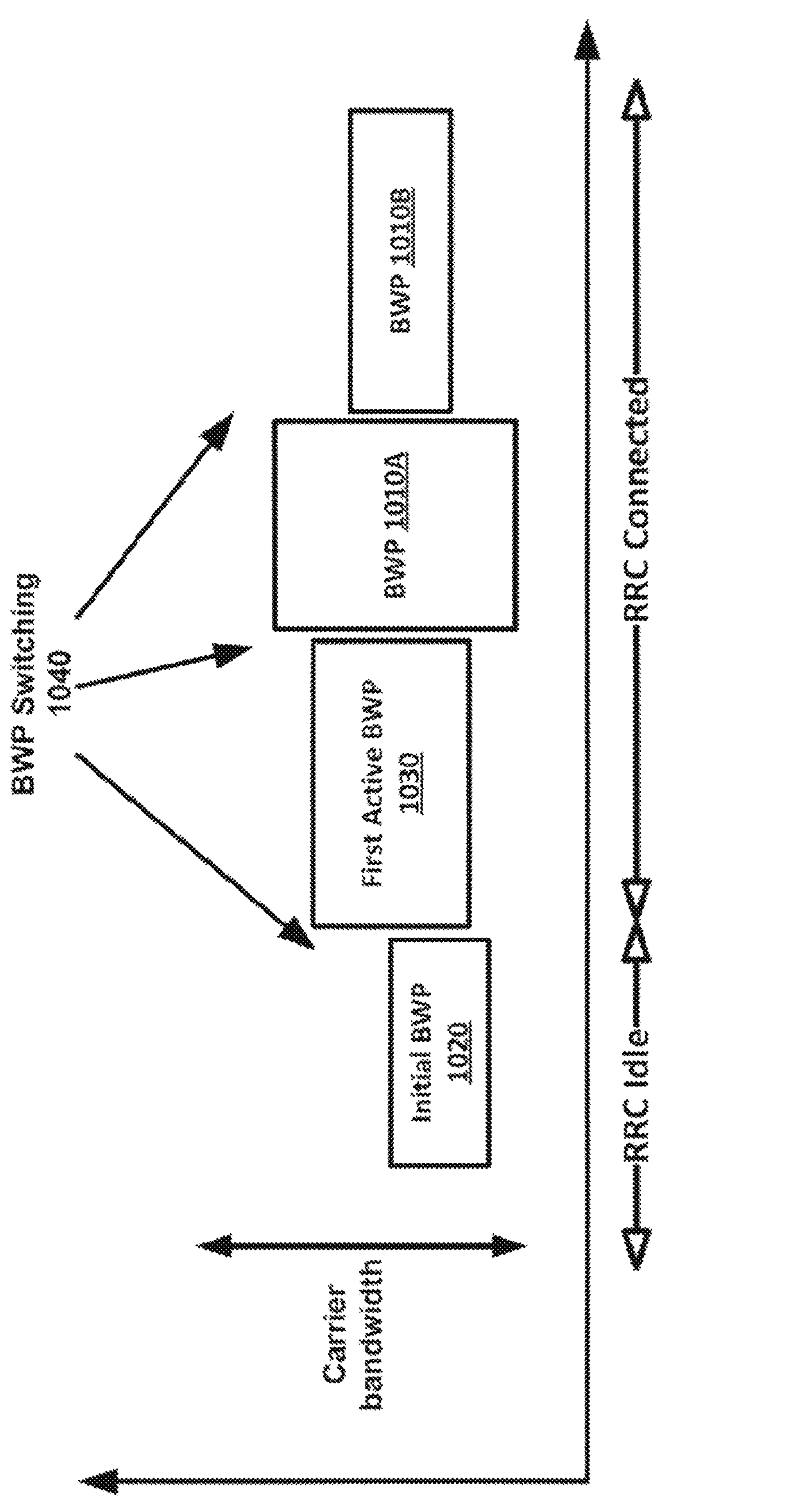
FIG. 10 shows example bandwidth part configuration and switching according to some aspects of some of various exemplary embodiments of the present disclosure.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g. to shrink during period of low activity to save power); the location may move in the frequency domain (e.g. to increase scheduling flexibility); and the subcarrier spacing may be ordered to change (e.g. to allow different services). The first active BWP 1020 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
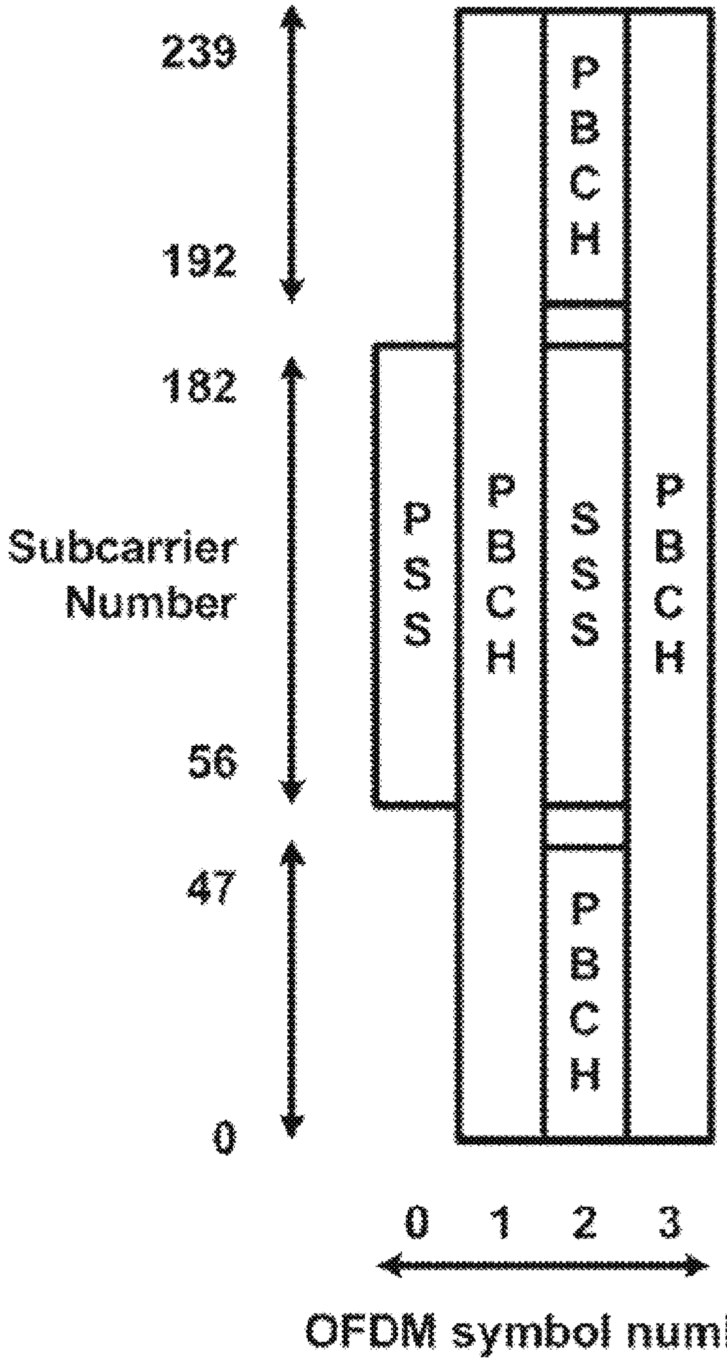
FIG. 11 shows example time and frequency structure of Synchronization Signal and Physical Broadcast Channel (PBCH) Block (SSB) according to some aspects of some of various exemplary embodiments of the present disclosure.

FIG. 11 shows example time and frequency structure of Synchronization Signal and Physical Broadcast Channel (PBCH) Block (SSB) according to some aspects of some of various exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 11), and PBCH spanning across 3 OFDM symbols and 240 subcarriers, but on one symbol leaving an unused part in the middle for SSS as show in FIG. 11. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e. using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 12:
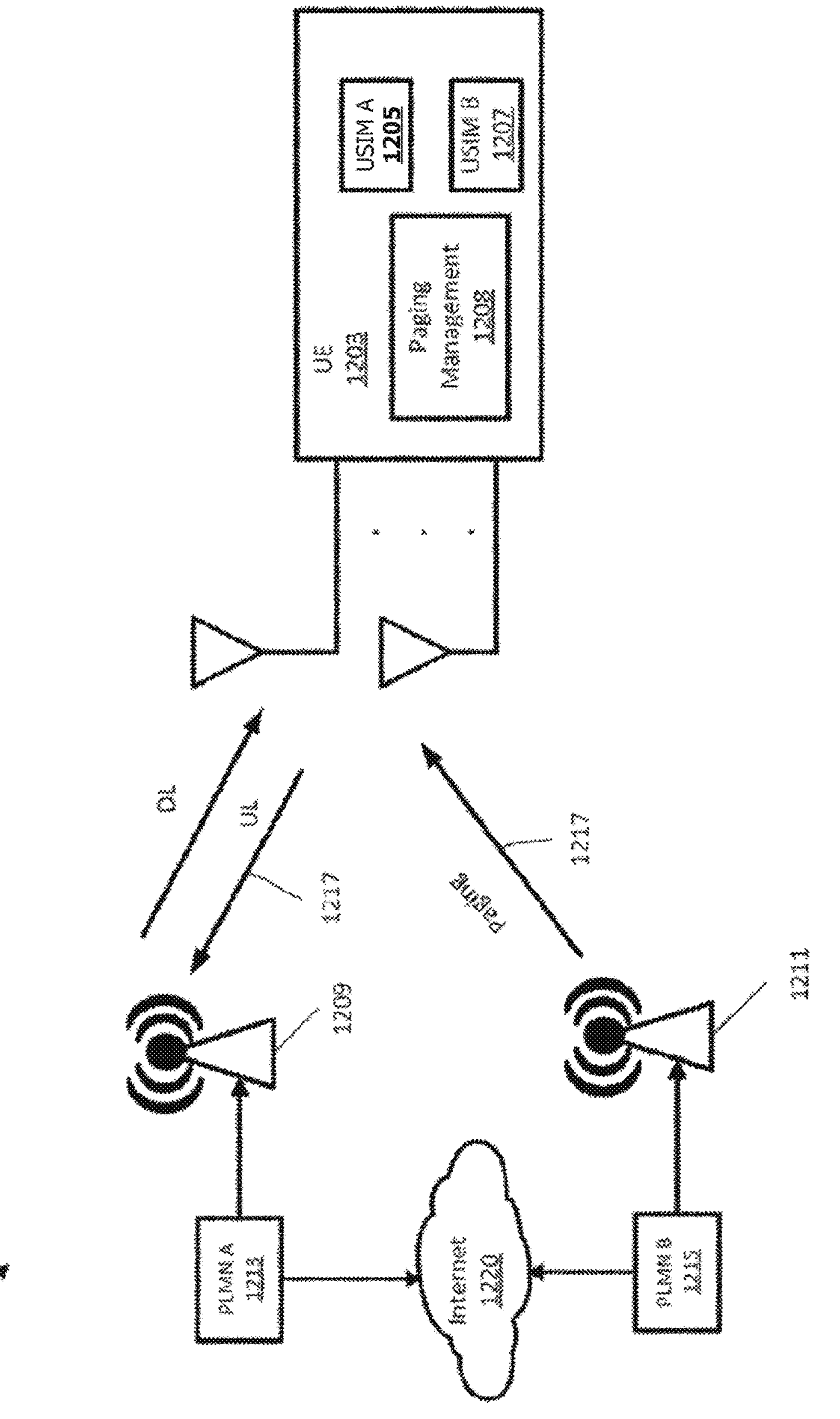
FIG. 12 shows example of a wireless communication system including two networks and a UE with Multi-USIM capability according to some aspects of some of various exemplary embodiments of the present disclosure.

FIG. 12 shows a wireless communication system 1200 including two networks according to some aspects of some of various exemplary embodiments of the present disclosure. The UE 1203 may be configured to establish wireless connection with base stations 1209, 1211. The UE 1203 may include Universal Subscriber Identity Module (USIM) A 1205, and USIM B 1207 for communications to network 1213, and 1215 respectively. For example, the UE 1203 may be configured to transmit/receive data via the base station 1209 to/from the network 1213. The UE 1203 may further be configured to transmit/receive data via the base station 1211 to/from the network 1215. The networks 1213, 1215 are connected to internet 1220, and may transmit/receive data to/from each other via the internet 1220.

The wireless networks 1213, 1215 may be examples of mobile communication network of FIG. 1. The network 1213, 1215 may use multiple access techniques including, but not limited to, Orthogonal Frequency Division Multiplexing (OFDM), Frequency Division Multiplexing (FDMA), Code Divisional Multiplexing (CDMA), Time Divisional Multiplexing (TDMA), 4G Long Term Evolution (LTE), 5G NR, or other multiple access schemes that may be used in a mobile communication network. The networks 1213, 1215 may use the same or different multiple access technologies.

In some embodiments, the wireless networks 1213, 1215 may be cellular communication networks (e.g., 3GPP network) or Wireless Local Area Network (WLAN). The UE 1203 may establish simultaneous connections to 3GPP cellular network and Wi-Fi simultaneously. While the various examples are described herein in context of 3GPP wireless networks, the examples are not limited to 3GPP wireless network, and may also be implemented with any network.

In the wireless network 1200, the UE 1203 may have multiple USIMs to connect to multiple wireless networks. For example, the UE 1203 may be a Dual-USIM device that is capable to connect to networks (e.g., network 1213, 1215). Using dual-USIM functionality, the UE 1203 may simultaneously access the two networks 1213, 1215.

The UE 1203 may register to the network 1213, 1215 using the information stored in the USIM A and USIM B. Once the UE 1203 completes the registration process, it may establish connections with the networks 1213, and/or 1215. The UE 1203 may make a call (e.g., voice or data service) to third party using one of USIMs. The UE 1203 may also receive a voice call or data transmission service from a third party (e.g., UE 125E).

In some embodiments, the UE 1203 may have dual Radio Frequency (RF) transceivers; the dual RF transceivers enables the UE 1203 to simultaneously transmit/receive data to/from networks 1213, 1215 on the same or different frequency channels. In some embodiments, the UE 1203 may have single RF transceiver. If the UE 1203 has single RF transceiver, it can transmit/receive data to networks 1213, 1215 at one time.

In some variants, the UE 1203 may be registered to more than one network, and need to be able to receive pages from more than one network. For instance, the UE may actively be communicating with one network while another network pages the UE. Paging Management (PM) module 1208 detects paging and manage collisions requests from networks 1213, 1215. For example, the UE 1203 detects whether paging collision occurs from the networks 1213, 1215, and notifies the networks 1213, 1215 its desired paging pattern. If the UE 1203 detects paging collisions during the registration to the network 1213, 1215, it may indicate to the networks that it needs the network assistance for configuring the paging from the networks.

The PM module 1208 can be configured to determine the priority of different services in USIM A and USIM B before registering to the networks. The priority of different services may be configured by the user or based on a pre-configured logic. The priority of different services may vary according to the time or geographical location of the UE or some UE local configurations. For example, in some scenarios, MT service of "voice" type of PLMN B has a higher service preference than "voice" type service of PLMN A, and therefore it may be always presented to the user. Another example of pre-configured logic is the "SMS" type service of USIM B has a higher service preference than "voice" type service of USIM A, and can trigger the UE to respond to paging. In some examples, if mobile terminated (MT) service of "voice" type of USIM B has a higher service preference than "voice" type service of USIM A, and therefore it may be presented to the user even if the user is actively engaged in "voice" service with USIM A. In some other examples, "SMS" type service of USIM B has a higher service preference than "voice" type service of USIM A, and may trigger the UE to respond to paging regardless of engaging in "voice" type service with USIM A.

Figure 13:
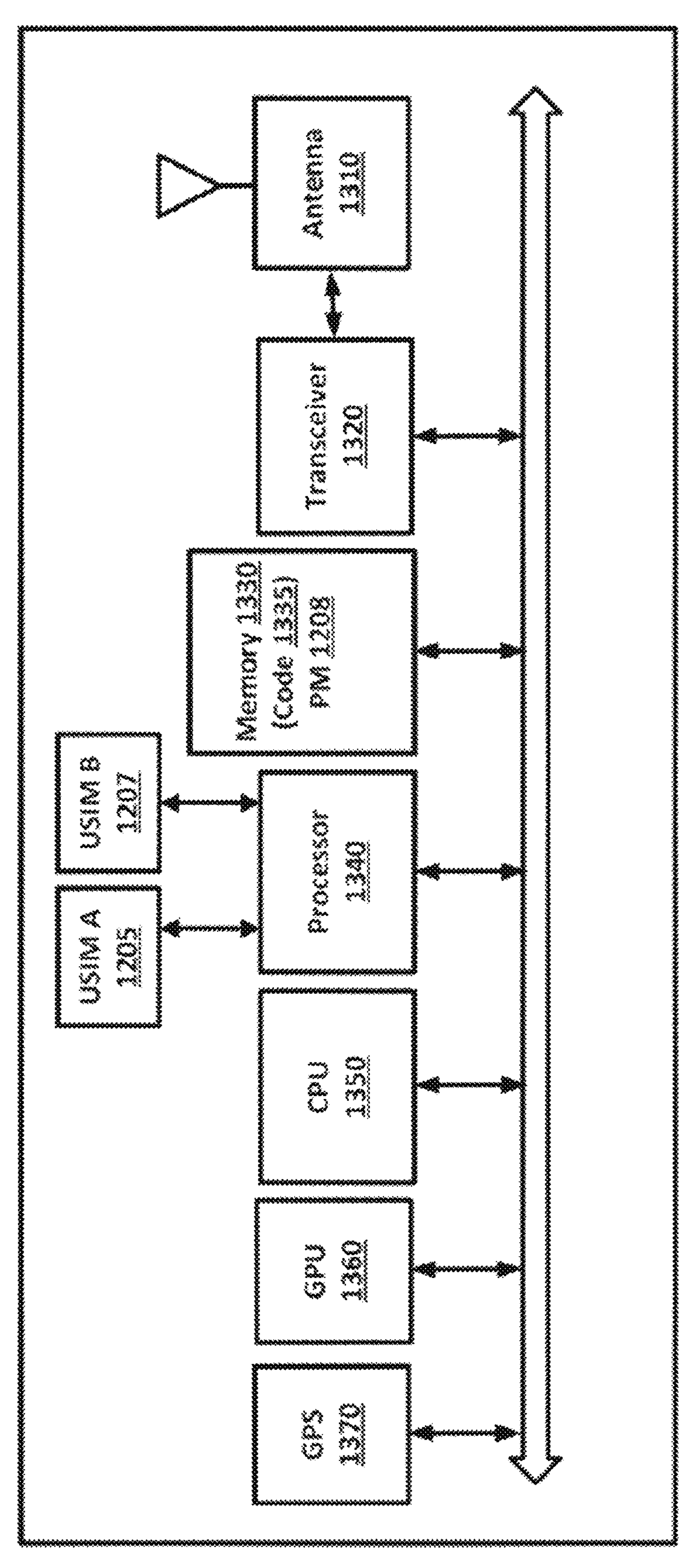
FIG. 13 shows example components of a Multi-USIM UE according to some aspects of some of various exemplary embodiments of the present disclosure.

FIG. 13 shows example components of a user equipment 1203 according to some aspects of some of various exemplary embodiments of the present disclosure. All or a subset of blocks and functions in FIG. 13 may be in the user equipment 1203 and may be performed by the user equipment 1203. The Antenna 1310 may be used for transmission or reception of electromagnetic signals. The Antenna 1310 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 1310 may enable a massive MIMO configuration with tens or hundreds of antenna elements. The Antenna 1310 may enable other multi-antenna techniques such as beamforming. In some examples and depending on the UE 1203 capabilities or the type of UE 1203 (e.g., a low-complexity UE), the UE 1203 may support a single antenna only.

The transceiver 1320 may communicate bi-directionally, via the Antenna 1310, wireless links as described herein. For example, the transceiver 1320 may represent a wireless transceiver at the UE and may communicate bi-directionally with the wireless transceiver at base station or vice versa. The transceiver 1320 may include a modem to modulate the packets and provide the modulated packets to the Antennas 1310 for transmission, and to demodulate packets received from the Antennas 1310.

The memory 1330 may include RAM and ROM. The memory 1330 may store computer-readable, computer-executable code 1335 including instructions that, when executed, cause the processor to perform various functions described herein. In some examples, the memory 1330 may contain, among other things, a Basic Input/output System (BIOS) which may control basic hardware or software operation such as the interaction with peripheral components or devices. The memory 1330 may include PM 1208 to manage paging services from different networks (e.g., network 1213, 1215), detects the occurrence of paging collision, and determine the UE's desired paging pattern as described previously in FIG. 12. In some embodiments, the PM 1208 may be individually or partially be implemented in software, firmware and/or hardware.

The processor 1340 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1340 may be configured to operate a memory using a memory controller. In other examples, a memory controller may be integrated into the processor 1340. The processor 1340 may be configured to execute computer-readable instructions stored in a memory (e.g., the memory 1330) to cause the UE 1203 to perform various functions.

USIMs 1205, 1207 may be integrated circuit cards that are configured to enable the UE to access to a wireless cellular or non-cellular network. In some embodiments, the USIMs 1205, 1207 may be removable user identity modules or cards. Each USIM may include a CPU, ROM, RAM, EPROM and I/O circuits. In some embodiments, the USIMs 1205, 1207 may include user subscription information, and storage for phone book contacts. USIM 1205, 1207 may further store Home PLMN (HPLMN) code to indicate the network operator provider, Network Identification Number (NIN), etc.

The Central Processing Unit (CPU) 1350 may perform basic arithmetic, logic, controlling, and Input/output (I/O) operations specified by the computer instructions in the Memory 1330. The user equipment 1203 may include additional peripheral components such as a graphics processing unit (GPU) 1360 and a Global Positioning System (GPS) 1370. The GPU 1360 is a specialized circuitry for rapid manipulation and altering of the Memory 1330 for accelerating the processing performance of the user equipment 1203. The GPS 1370 may be used for enabling location-based services or other services for example based on geographical position of the user equipment 1203.

Figure 14:
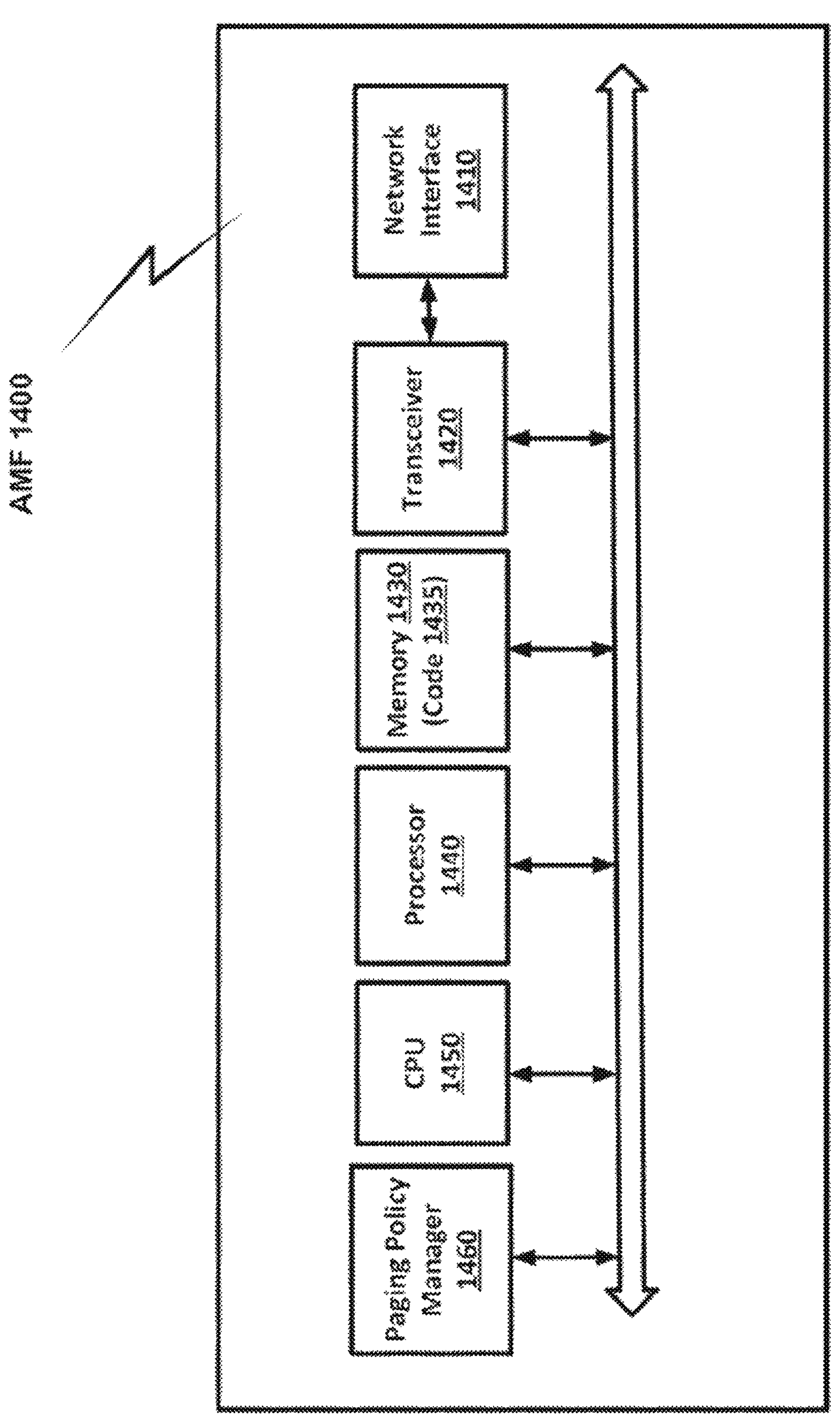
FIG. 14 shows example components of an Access and Mobility Management Function (AMF) according to some aspects of some of various exemplary embodiments of the present disclosure.

FIG. 14 shows example components of an Access and Mobility Management Function (AMF) 1400 according to some aspects of some of various exemplary embodiments of the present disclosure. All or a subset of blocks and functions in FIG. 14 may be in the AMF 1400 and may be performed by the AMF equipment 1400. The network interface 1410 may be used for transmission or reception of data and control signals to a network (e.g., LTE, 5G network). The network interface 1410 may include an integrated circuit for the transmission and reception of data using a specific data transmission protocol (e.g., Ethernet). The network interface 1410 enables network protocol stacks to be implemented by AMF 1400, allowing communication among different nodes on the same or different networks through routable protocols.

The transceiver 1420 may communicate bi-directionally, via the interface 1410. For example, the transceiver 1420 may include an RF converter, and may communicate bi-directionally with the base stations. The transceiver 1420 may include a modem to modulate the packets and provide the modulated packets to the interface 1410 for transmission, and to demodulate packets received from the interface 1410.

The memory 1430 may include RAM and ROM. The memory 1430 may store computer-readable, computer-executable code 1435 including instructions that, when executed, cause the processor to perform various functions described herein. In some examples, the memory 1430 may contain, among other things, a Basic Input/output System (BIOS) which may control basic hardware or software operation such as the interaction with peripheral components or devices.

The Paging Policy Manager (PPM) 1406 manages paging to different UEs (e.g., UE 1203), as described previously in FIG. 12. The PPM 1406 allows AMF 1400 to apply different paging strategies for different traffic or service types associated with the same or Different protocol Data Unit (PDU) sessions. The paging policies may be defined for different services based on their processing priority on different networks. In some embodiments, the PPM 1406 may be individually or partially be implemented in software, firmware and/or hardware.

The processor 1440 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1440 may be configured to operate a memory using a memory controller. In other examples, a memory controller may be integrated into the processor 1440. The processor 1440 may be configured to execute computer-readable instructions stored in a memory (e.g., the memory 1430) to cause the AMF 1400 to perform various functions.

The Central Processing Unit (CPU) 1450 may perform basic arithmetic, logic, controlling, and Input/output (I/O) operations specified by the computer instructions in the Memory 1430.

Figure 15:
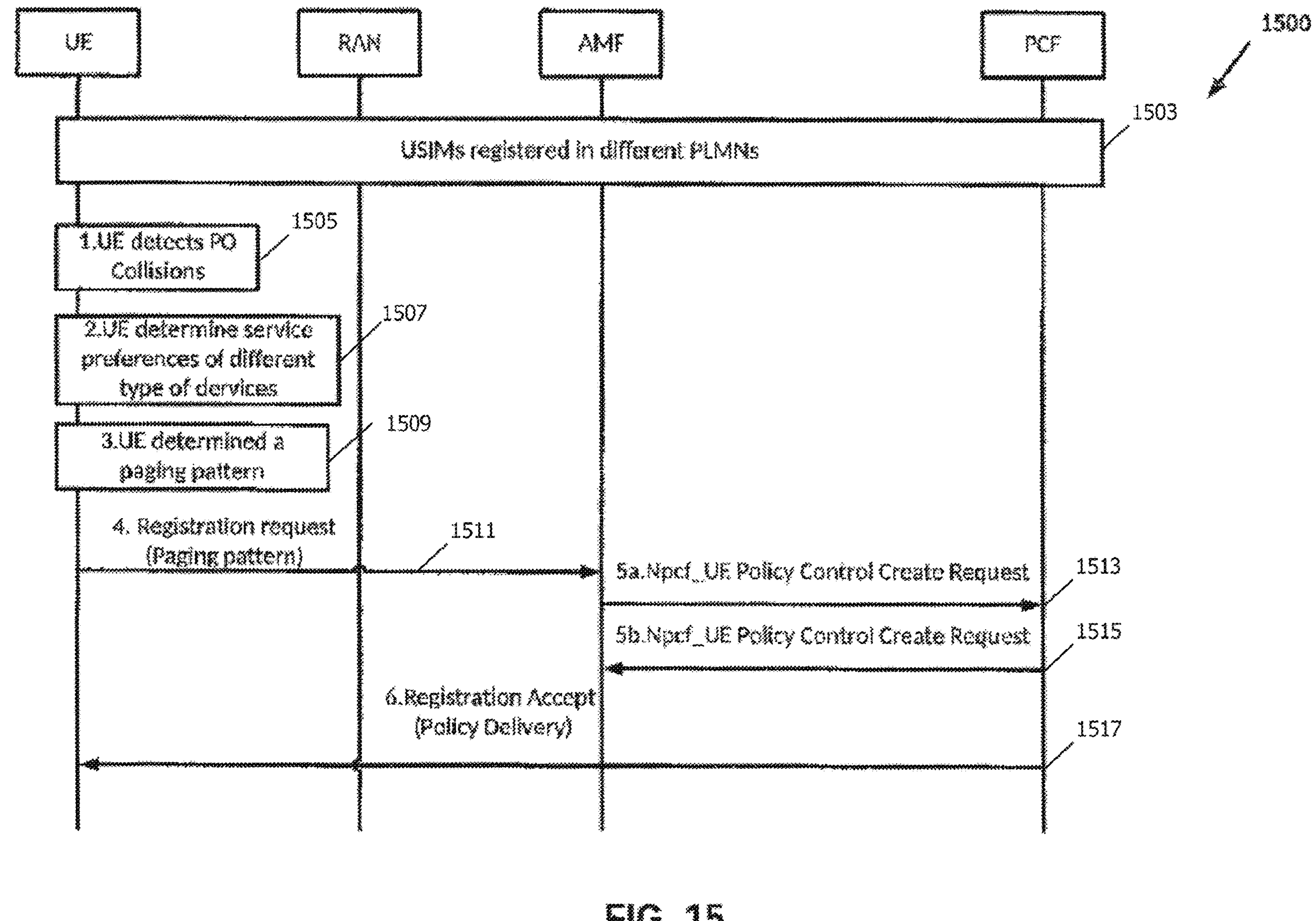
FIG. 15 is a logic diagram illustrating example of communication between UE and Network according to some aspects of some of various exemplary embodiments of the present disclosure.

FIG. 15 shows a logic flow diagram of a method 1500 illustrating the communication flow between a Multi-USIM (MUSIM) UE and the network components according to some aspects of some of various exemplary embodiments of the present disclosure. The UE may determine the priority of processing of different services on different USIMs before the registration to network. In some embodiments, the priority of processing of different services may depend on time or geographical location of the UE or some local UE configuration.

At step 1503, the UE registers to the network associated with PLMN A (or PLMN B). Upon registration to the network, the UE may indicate to the network (AMF) that it has multi-USIM functionality.

At step 1505, the UE calculates a first paging occasion (PO) related to the first USIM, and a second paging occasion related to the second USIM, and determines whether the first PO collides with the second PO. If the first PO collides with the second PO, paging collisions occurs. If a paging collision is detected during the registration process, the UE may indicate in registration message that it desires to have network assistance to avoid collisions.

At step 1507, the UE ranks services of PLMNs based on their priorities. In some examples, the priorities of services may depend on the criticality of communication service associated to transmission of each message. The service priorities can be configured by the user or based on a pre-configured logic. The priorities of different services may vary according to the time or geographical location of the UE or some UE local configurations.

At step 1509, the UE determines a paging pattern indicating how it would like to be paged from different networks. For example, if a service is considered an urgent service, which is required to be paged in any occasions, the UE may allocate the first available paging occasion (PO) to it. In some examples, the paging pattern is pre-configured by the UE in USIM A and USIM B at the time of registration to the networks.

In some examples, the UE may determine a paging pattern based on a policy rule. The UE may determine the policy rule for processing paging services for the PLMN A and PLMN B according to paging patterns, and then determine the paging patterns according to the policy rule. The policy rule may be provisioned to the UE by PCF or pre-configured by the UE in USIM A and USIM B at the time of registration to the networks. The services priorities may vary according to the time or geographical location of the UE or some UE local configuration. The policy rule may include at least a rule precedence, a traffic descriptor, route selection descriptor, and route selection validation criteria as specified in Table 1.

TABLE 1

| Policy Rule | |
|---|---|
| UE Policy Rule | Descriptions |
| Rule Precedence | Define the precedence of the rule |
| Traffic Descriptor | Includes application descriptors |
| Route Selection Descriptor | Includes DNN selection |

TABLE 1-continued

| Policy Rule | |
|---|---|
| UE Policy Rule | Descriptions |
| Route Selection Validation | Includes time window and location allowed for matching traffic |

DNN Selection field in exemplary policy rule specified in Table 1 indicates the traffic of the matching service shall be routed via a Protocol Data Unit (PDU) Session to the included Data Networks (DNNs). Traffic Descriptor indicates the traffic of the indicated service should be transferred on a PDU session via the selected DNN.

The procedure for associating applications and services to PDU sessions are similar to URSP rules:

Each policy rule can contain a list of route selection descriptors, each having a different route selection descriptor precedence. Once the UE receives a paging request (e.g., from an application or service), the UE may evaluate the policy rules in the order of rule precedence and determines if the application is matching traffic descriptor of any policy rules. If a valid route selection descriptor is found, the UE may determine if there is an existing PDU session that matches the route selection descriptor. The UE may compare the selected route selection descriptor with the existing PDU sessions, and if a matching PDU session exist the UE associates the application to the existing PDU session, i.e. route the traffic of the application on this PDU session. If none of the existing sessions matches, the UE may try to establish a new session using the value specified by the selected route selection descriptor.

If a paging pattern is rejected by one network, the UE may define a new paging pattern. Alternatively, the UE may monitor POs from different networks periodically. For instance, the UE may first monitor POs for PLMN A (PLMN A paging pattern is accepted) paging channels, and then monitors POs for PLMN B (PLMN B paging pattern is rejected) paging channels.

At step 1511, the UE request registration to the networks. The UE may register via its home network for both networks.

At step 1513, the AMF initiates establishment of UE policy association with PCF by Npcf_UEPolicyControlCreate request, including the MUSIM indication to inform the PCF that the MUSIM communication would be enabled.

At step 1515, the PCF establishes the paging collision avoidance with AMF.

At step 1517, the AMF registers the UE, and enables MUSIM capability for the UE.

Figure 16:
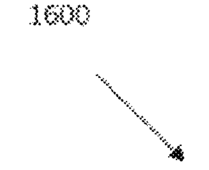
FIG. 16 is a flow diagram of a method of a UE performing paging collision avoidance and Multi-USIM operation according to some aspects of some of various exemplary embodiments of the present disclosure.
Figure 16:
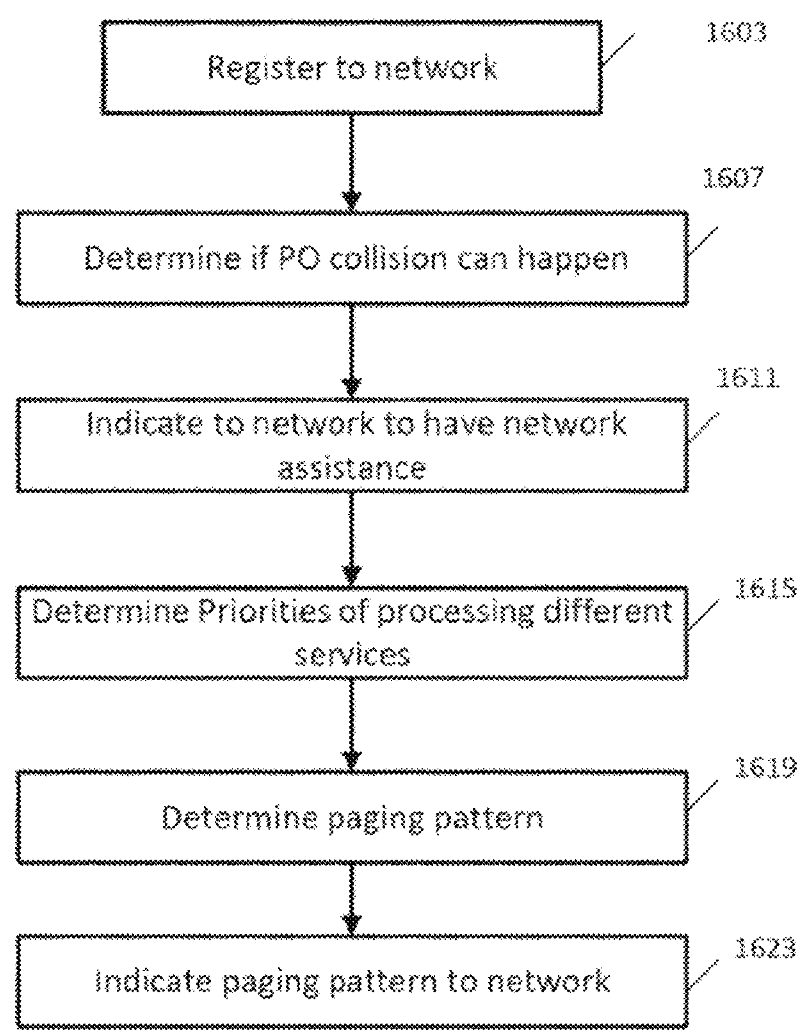

FIG. 16 is a flow diagram of method 1600 illustrating a MUSIM UE performing registration according to some aspects of some of various exemplary embodiments of the present disclosure.

At step 1603, the UE registers to networks (e.g., PLMN A, PLMN B). In the registration process, the UE performs a RACH process to initiate the communication with gNB, completes the security process with the gNB, and establish an RRC connection with the gNB.

At step 1607, the UE calculates the POs from different networks, and detects if paging collisions can occur.

At step 1611, If a collision is detected during the registration process, the UE may indicate that it desires to have network assistance to avoid collisions.

At step 1615, the UE ranks priority of processing different services of the different USIMs. The UE may determine a paging policy for processing different services.

At step 1619, the UE determines paging patterns for different network. The paging patterns are determined based on the priorities of different services.

At step 1623, the UE notifies its desired paging patterns to the networks (e.g., PLMN A, PLMN B)

Figure 17:
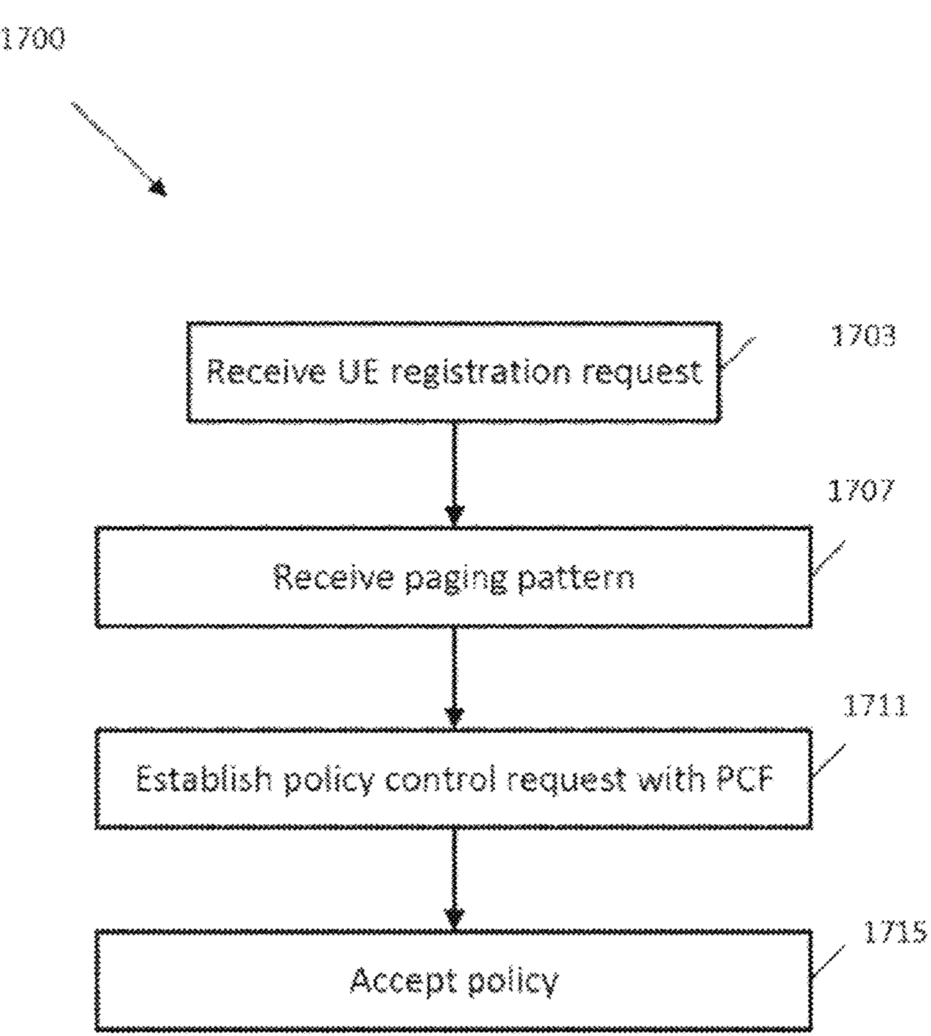
FIG. 17 is a flow diagram of a method of an AMF performing paging policy management for paging collision avoidance according to some aspects of some of various exemplary embodiments of the present disclosure.

FIG. 17 is a flow diagram of method 1700 illustrating a AMF performing registration according to some aspects of some of various exemplary embodiments of the present disclosure.

At step 1703, AMF receives UE registration request. The AMF may determine the UE MUSIM capability, and accepts the registration request.

At step 1707, the AMF receives the UE desired paging patterns from the networks (e.g., PLMN A, PLMN B).

At step 1711, the AMF initiates the establishment of UE policy association with PCF. In addition, AMF, informs the PCF that the MUSIM communication would be enabled.

At step 1715, the AMF indicates the acceptance of the paging policies to the UE.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium.

Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

The invention claimed is:

1. A method for a multiple universal subscriber identification module (MUSIM) user equipment (UE) having at least a first universal subscriber identification module (USIM) and a second USIM, the method comprising:

determining at least one of a first paging pattern indicative of service types to be paged for the first USIM or a second paging pattern indicative of service types to be paged for the second USIM;

transmitting, to a network access node, the at least one of the first paging pattern or the second paging pattern; and receiving, from the network access node, a message indicating whether the at least one of the first paging pattern or the second paging pattern is accepted or rejected.

2. The method of claim 1, wherein determining the at least one of the first paging pattern or the second paging pattern comprises:

associating a priority-based ranking to the service types associated with each of the first USIM and the second USIM; and determining the at least one of the first paging pattern or the second paging pattern based on the priority-based ranking of the service types.

3. The method of claim 2, wherein the priority-based ranking of the service types is configured by a user.

4. The method of claim 2, wherein the priority-based ranking of the service types is pre-configured by UE manufacturers.

5. The method of claim 2, wherein associating the priority-based ranking to the service types depends on time or geographical location or both.

6. The method of claim 1, wherein the network access node is an Access and Mobility management Function (AMF).

7. The method of claim 1, further comprising:

determining a third paging pattern if the first paging pattern is rejected by the network access node, or a fourth paging pattern if the second paging pattern is rejected by the network access node.

8. A method for a network access node in a wireless communication system, the method comprising:

receiving, from a multiple universal subscriber identification module (MUSIM) user equipment (UE) having at least a first universal subscriber identification module (USIM) and a second USIM, at least one of a first paging pattern indicative of service types to be paged for the first USIM or a second paging pattern indicative of service types to be paged for the second USIM; and transmitting, to the MUSIM UE, a message indicating whether the at least one of the first paging pattern or the second paging pattern is accepted or rejected.

9. The method of claim 8, wherein the network access node is an Access and Mobility management Function (AMF) node.

10. A user equipment (UE), comprising:

at least a first universal subscriber identification module (USIM) and a second USIM;

a processor configured to:

determine at least one of a first paging pattern indicative of service types to be paged for the first USIM or a second paging pattern indicative of service types to be paged for the second USIM; and a transceiver configured to:

transmit, to a network access node, the at least one of the first paging pattern or the second paging pattern; and receive, from the network access node, a message indicating whether the at least one of the first paging pattern or the second paging pattern is accepted or rejected.

11. A network access node in a wireless communication system comprising:

a transceiver configured to:

receive, from a multiple universal subscriber identification module (MUSIM) user equipment (UE) having at least a first universal subscriber identification module (USIM) and a second USIM, at least one of a first paging pattern indicative of service types to be paged for the first USIM or a second paging pattern indicative of service types to be paged for the second USIM; and transmit, to the MUSIM UE, a message indicating whether the at least one of the first paging pattern or the second paging pattern is accepted or rejected.

* * * * *